US012663313B2

(12) United States Patent
Artsemenka et al.

(10) Patent No.: US 12,663,313 B2
(45) Date of Patent: Jun. 23, 2026

(54) SENSOR BRIDGE ASSEMBLY

(71) Applicant: CHORUSVIEW, INC., Las Vegas, NV (US)

(72) Inventors: Artsem Artsemenka, San Francisco, CA (US); Phillip Yee, San Francisco, CA (US); Carl Turner, Eugene, OR (US); Russell Shikami, Cupertino, CA (US)

(73) Assignee: CHORUSVIEW, INC., Las Vegas, NV (US)

( * ) Notice: Subject to any disclaimer, the term of this patent is extended or adjusted under 35 U.S.C. 154(b) by 359 days.

(21) Appl. No.: 18/239,185

(22) Filed: Aug. 29, 2023

(65) Prior Publication Data

US 2025/0076122 A1     Mar. 6, 2025

(51) Int. Cl.
*G01J 5/24*        (2006.01)
*G01J 5/02*        (2022.01)
*G01J 5/04*        (2006.01)

(52) U.S. Cl.
CPC ............. *G01J 5/0205* (2013.01); *G01J 5/025* (2013.01); *G01J 5/045* (2013.01); *G01J 5/24* (2013.01)

(58) Field of Classification Search
CPC .......... G01J 5/0205; G01J 5/025; G01J 5/045; G01J 5/24
See application file for complete search history.

(56) References Cited

U.S. PATENT DOCUMENTS

| | | | |
|---|---|---|---|
| 3,690,177 | A | 9/1972 | Fluegel |
| 5,449,234 | A * | 9/1995 | Gipp ...................... G01K 13/02 |
| | | | 374/185 |
| 10,297,140 | B2 * | 5/2019 | Cavalcanti ............. G16H 40/67 |
| 2012/0237402 | A1 | 9/2012 | Cantarelli et al. |
| 2017/0023458 | A1 * | 1/2017 | Hart ................... G01N 15/1459 |
| 2020/0044517 | A1 | 2/2020 | Dunn et al. |
| 2021/0086495 | A1 | 3/2021 | Michels |
| 2022/0027698 | A1 * | 1/2022 | Volkerink .......... G06K 19/0723 |
| 2022/0173481 | A1 | 6/2022 | Yoon et al. |
| 2023/0000667 | A1 | 1/2023 | Patton et al. |
| 2023/0176007 | A1 | 6/2023 | West et al. |
| 2023/0194450 | A1 | 6/2023 | Rüegg et al. |
| 2023/0204271 | A1 | 6/2023 | Kim et al. |

FOREIGN PATENT DOCUMENTS

EP            3367087 A2       8/2018

* cited by examiner

*Primary Examiner* — Peter J Macchiarolo
*Assistant Examiner* — Mireille S Sadate-Moualeu
(74) *Attorney, Agent, or Firm* — Botos Churchill IP Law LLP

(57) ABSTRACT

A device includes a casing, circuitry within the casing, and a temperature sensor. The temperature sensor is connected to the circuitry and is attached to the casing in such a way that an air gap separates the temperature sensor from the casing. The temperature sensor is attached to the casing in a bridge. The bridge includes a first backing and a second backing, which includes a grommet. The temperature sensor is positioned between a portion of the first backing and a portion of the second backing, and includes a flex lead that is electrically connected through the grommet of the second backing to the circuitry inside the casing.

20 Claims, 10 Drawing Sheets

FIGURE 5B

Warehouse

In Transit

Hospital

100

200

400

420

800

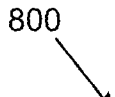

802 Form a sensor bridge assembly by positioning a temperature sensor between a portion of a backing and a portion of a gasket, with a flex lead of the temperature sensor positioned through a grommet of the gasket 806 Attach the sensor bridge assembly to a casing of a tracking tag reader such that there is an air gap between the temperature sensor and the casing and such that the flex lead connects the temperature sensor through an opening of the casing to circuitry inside the casing

FIGURE 8

SENSOR BRIDGE ASSEMBLY

BACKGROUND

The Internet of Things (IoT) is the inter-networking of physical objects, such as products, packages, vehicles, buildings, etc., that are embedded with electronic components for network connectivity. The embedded components enable objects to detect others, be detected by others, collect data and/or transmit data. In some examples, the embedded components may include tags or labels attached to the physical objects. These tags or labels may be passive or active. The inter-networking capabilities may be leveraged for tracking locations of physical objects. In many situations, objects may be moved at different points in time, such as a package or equipment moved from a truck to a loading dock to a warehouse, or medical equipment that is moved between different rooms (or floors) in a hospital. These types of situations can be very challenging to determine the location of the object with suitable accuracy, including updating of the location as it changes. In addition, systems that use GPS or Wi-Fi may suffer from signal dropout or transmitters going offline, which can reduce the ability to properly identify an object's location.

BRIEF SUMMARY

According to aspects of the technology, a device includes a casing; circuitry within the casing; and a temperature sensor. The temperature sensor is connected to the circuitry and is attached to the casing in such a way that an air gap separates the temperature sensor from the casing. The temperature sensor may be attached to the casing in a bridge. The bridge may include a first backing and a second backing. The second backing may include a grommet. The temperature sensor may be positioned between a portion of the first backing and a portion of the second backing. The temperature sensor may include a flex lead that is electrically connected through the grommet of the second backing to the circuitry within the casing. The first backing may comprise polycarbonate. The second backing may comprise silicone. The first backing may be further from the casing and may be more rigid than the second backing.

The device may also include a gasket that seals an opening in the casing of the device.

The air gap may be indented into a side of the casing.

The temperature sensor may be one of a thermistor or a resistance temperature detector. The temperature sensor may be one of a thermocouple or an infrared photo-diode.

According to aspects of the technology, a sensor bridge assembly includes a first backing; a second backing; and a temperature sensor that is positioned between a portion of the first backing and a portion of the second backing. The sensor bridge assembly may include a flex lead that may be electrically connected to the temperature sensor and that may extend through a grommet of the second backing. The first backing may comprise polycarbonate. The second backing may comprise silicone.

The temperature sensor may be one of a thermistor or a resistance temperature detector. The temperature sensor may be one of a thermocouple or an infrared photo-diode.

According to aspects of the technology, a method for manufacturing a device for sensing ambient temperature includes forming a sensor bridge assembly by positioning a temperature sensor configured to sense the ambient temperature between a portion of a first backing and a portion of a second backing, and attaching the sensor bridge assembly to a casing of the device such that an air gap separates the temperature sensor from the casing. The second backing may have a grommet at one end thereof and a flex lead of the temperature sensor may protrude through the grommet of the second backing, such that the flex lead connects through an opening in the casing to circuitry inside the casing. The method may include placing a gasket onto the grommet to seal the opening in the casing of the device.

The first backing may comprise polycarbonate. The second backing may comprise silicone. The temperature sensor may be one of a thermistor or a resistance temperature detector. The temperature sensor may be one of a thermocouple or an infrared photo-diode.

BRIEF DESCRIPTION OF THE DRAWINGS

FIG. 8 depicts steps of a method for making a tracking tag reader in accordance with aspects of the disclosure.

DETAILED DESCRIPTION

Overview

Figure 1A:
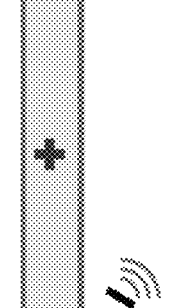
FIG. 1A illustrates various examples for localization of objects in accordance with aspects of the technology.
Figure 1A:
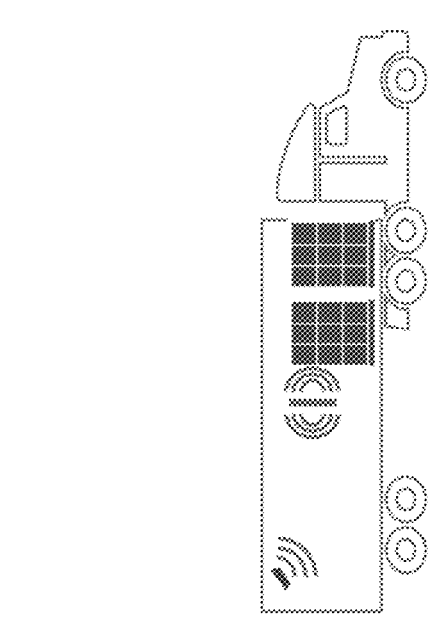
Figure 1A:
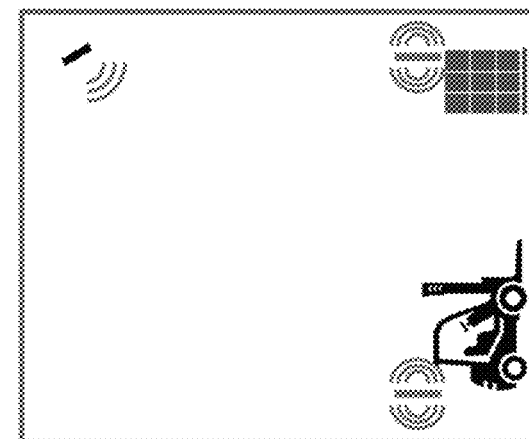

The technology relates to electrically sensing the ambient temperature outside of a device that generates heat internally. In some instances, heat from the device itself can bias the sensed ambient temperature (e.g., actual ambient temperature may be lower than sensed ambient temperature), and typical approaches for insulating the temperature sensor from heat from the device can make the temperature sensor slower to respond to ambient changes.

A device such as a tracking tag reader may integrate the functions of both a tracking tag and a reader. For example, a tracking tag may be placed on or otherwise attached to or inserted into an object to be tracked, such as a package, a piece of equipment, a vehicle, a warehouse section, a room, etc. The tracking tag may emit an informational signal, for example a beacon signal, to communicate data to a reader device. A reader may be a computing device configured to detect the beacon signals emitted by such tracking tags and then store and/or transmit data related to the tracking tags. In this regard, a tracking tag reader may perform the functions of both a tracking tag and a reader as discussed further below.

The device may be equipped with one or more sensors for detecting environmental conditions. For example, the device may be equipped with a temperature sensor. The temperature sensor may be external to a casing of the tracking tag reader. For instance, the temperature sensor may be separated from the casing by an air gap.

The temperature sensor may be attached to the device in a sensor bridge assembly so as to provide the air gap. In addition to the temperature sensor, the sensor bridge assembly may also include a first backing and a second backing.

The second backing may also include a portion which may be shaped as a funnel or other design. The shape and material of the portion may allow the portion to fit within a corresponding opening in the casing of the device. A flex lead may be placed through the portion and the opening in order to connect the temperature sensor to circuitry inside the casing. Alignment features may be sized and shaped to mate with one another in order to align and engage the first backing and the second backing as well as the temperature sensor in a desired orientation.

The air gap may function to isolate the temperature sensor from the heat generated by circuitry within the device and emanating from the casing. The air gap also may increase the temperature sensor's exposure to ambient conditions, compared to a sensor mounted directly on the casing. Thus, exposing the temperature sensor to ambient conditions at both sides of the sensor bridge assembly may increase the temperature sensor's responsiveness to the environment.

To make a device that can sense ambient conditions, a bridge may be formed by positioning the temperature sensor between a portion of a first backing and a portion of a second backing. A flex lead of the temperature sensor may be positioned through a grommet of the second backing, so that the temperature sensor is connected in communication with a sensor reading module within the casing. The sensor bridge assembly may be attached to the casing of the device such that an air gap separates the temperature sensor from the casing. As such, the temperature sensor may be attached to the casing and to the sensor reading module in such a way that heating of the temperature sensor from the casing is reduced while the temperature sensor's ability to sense ambient temperature is enhanced.

The features and methodology described herein may provide a device that senses ambient conditions such as temperature. A bridge structure may provide an air gap between a temperature sensor and a casing of the device. The air gap may increase surface area for sensing while also reducing the effects of heat generated by the device. Moreover, the design of the bridge may provide a compact form factor for the overall device. Thus, the device with the sensor bridge assembly may be more durable and portable compared to alternative solutions for reducing the effects of heat generated by the device on temperature sensors. In some instances, the temperature sensor may include a thermocouple, or an infrared photo-diode, which may have reduced power requirements as compared to other solutions.

Example Systems

FIG. 1A illustrates examples of different objects in various environments. As shown on the left side image of the figure, there may be packages or equipment on a pallet in a warehouse. The pallet may have come off of a cargo truck as shown by the "In Transit" image in the middle of the figure. The pallet may be moved to one or more different locations within a warehouse, such as by the forklift shown in the left side image. The right-side image in the figure illustrates a situation where medical equipment (e.g., a wheelchair) and supplies in boxes may be stored in a supply room in a hospital.

In all of these situations—in the warehouse, on the cargo truck, or at the hospital, the objects of interest may move around. That may be to a different aisle or room in the warehouse, a different room (or even a different floor) of the hospital, or different part of the cargo container of the truck.

In the latter case, the cargo may have shifted during transit or may have been repositioned as different packages were delivered to different locations. Knowing where the objects of interest are currently located, as opposed to where they are presumed to be based on an initial placement, is a valuable piece of information for an office manager, warehouse manager, nurse or orderly to have. Ideally, such people should be able to get the current location of a given object on their client computing device such as a laptop, mobile phone or smartwatch.

Figure 1B:
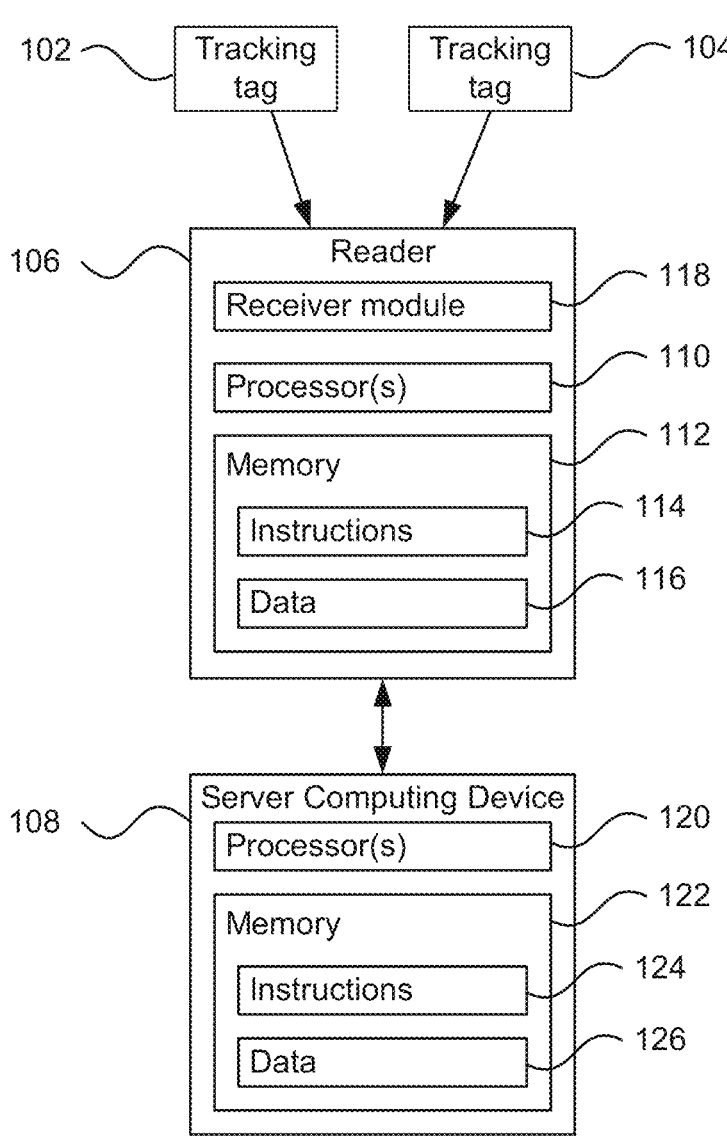
FIG. 1B is a functional diagram of an example tracking system in accordance with aspects of the disclosure.

FIG. 1B is a functional diagram of a tracking system 100. The tracking system 100 may include a plurality of tracking devices, such as tracking tags 102 and 104, and a reader 106. As discussed further below, one or more server computing devices 108 may also be part of the tracking system 100. A given tracking tag may be placed on or otherwise attached to or inserted into an object to be tracked, such as a package, a piece of equipment, a vehicle, a warehouse section, a room, etc. While tracking tags 102 may be associated with objects such as packages, equipment or vehicles (e.g., a forklift or an autonomous fulfillment robot that can retrieve packages from different locations in a warehouse), tracking tags 104 may be fixed to an aisle in a warehouse or from a specific room in a hospital. Thus, different tracking tags may be used depending upon customer needs. As an example, different customers may have varying accuracy and "liveliness" needs. For instance, one customer may only want to know aisle-level accuracy every day (e.g., before a warehouse closes for the evening), while another customer such as a hospital nurse may need to know which room a piece of equipment is in every hour so that it can be accessed should a patient need such equipment. Each tracking tag 102 or 104 may emit an informational signal, for example a beacon signal, via an antenna, such as using the transmitting device, to communicate data. In this regard, each tracking tag may include an identifier chip (such as for radiofrequency (RF) identification) and/or a transmitting device (such as an RF module configured to transmit beacon signals using a selected frequency band and transmission protocol). In this regard, the beacon signals may simply transmit identifying information in order to enable tracking of objects in the case of tracking tags discussed further below. To facilitate this, each tracking tag may be embedded with a unique identifier, such as a unique MAC address or BLUETOOTH identifier, which may function as a tracking tag identifier. This tracking tag identifier may be assigned to the tracking tag during the manufacturing or provisioning processes (described further below).

The transmitting device may send such information via radio frequency transmission in a selected frequency band, using a standard or proprietary protocol. By way of example, the transmitting device may employ a BLUETOOTH (e.g., a BLUETOOTH Low Energy (BLE)) or 802.11 protocol in the 2.4 GHz and/or 5 GHz frequency bands. In some examples, each beacon tracking tag and each tracking tag uses the BLUETOOTH or BLE protocol.

In some instances, the tracking tags may include one or more sensors. In such instances, the aforementioned communicated data may be formatted according to the selected protocol and include one or more sensed characteristics of the given tracking tag or its environment. For example, the sensed characteristic may be a temperature, a location, motion, battery conditions, trip conditions, and/or other detectable characteristics of the tracking devices or its environment.

The reader 106 may be a computing device configured to detect the beacon signals emitted by the plurality of tracking tags 102 and 104, then store and/or transmit data related to the tracking tags. While only one reader is shown in FIG. 1B, the system may employ multiple readers. The reader 106 may include one or more processors 110, memory 112 and other components typically present in general purpose computing devices. The reader 106 includes a receive module 118 having an antenna and a processing section (not shown), which may include a bandpass filter for the frequency band of interest, an analog to digital (A/D) converter, and a signal processing module to evaluate information in received beacon signals. The processing section may also convert the received beacon signal to a baseband signal, before or after A/D conversion.

The one or more processors 110 may be any conventional processors, such as commercially available CPUs or microcontrollers. Alternatively, the one or more processors may be a dedicated device such as an ASIC or other hardware-based processor, such as a field programmable gate array (FPGA). Although FIG. 1B functionally illustrates the processor(s), memory, and other elements of the reader 106 as being within the same block, the processor, computing device, or memory may actually include multiple processors, computing devices, or memories that may or may not be stored within the same physical housing. For example, memory may be a hard drive, a removable USB drive or other storage media located in a housing different from that of the reader 106. Accordingly, references to a processor or computing device will be understood to include references to a collection of processors or computing devices or memories that may or may not operate in parallel.

The memory 112 stores information accessible by the one or more processors 110, including instructions 114 and data 116 that may be executed or otherwise used by the processor(s) 110. The data may include sensed characteristics from any of the tracking tags 102 and/or 104 received by the reader 106. The memory 112 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 116 may be retrieved, stored or modified by processor(s) 110 in accordance with the instructions 114. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 114 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

In some implementations, the tracking system 100 may further include a central server, such as one or more server computing devices 108 accessible by the one or more processors 110 of the reader 106. In some implementations, one or more tracking devices in the tracking system 100, such as a tracking tag 104, may be configured to obtain and communicate data directly to the one or more server computing devices 108. The one or more server computing devices 108 may include one or more processors 120, memory 122 and other components typically present in general purpose computing devices. The one or more processors 120 may be the same or similar type as the one or more processors 110, and the memory 122 may be the same or similar type as the memory 112. The memory 122 stores information accessible by the one or more processors 120, including instructions 124 and data 126 that may be executed or otherwise used by the processor(s) 120. Data 126 and instructions 124 may be the same or similar type as the data 116 and instructions 114, respectively.

After detecting the beacon signals of one or more tracking tags 102 or 104, the reader 106 may transmit the data from the tracking tags to the one or more server computing devices 108 through an existing connection or through a network. Thus, in this case the reader 106 may include a transmitter module (not shown) that is configured for wired or wireless transmission to the server computing device. The data may be received in a series of payloads (e.g., data packets) either continually, at one or more set intervals, or ad hoc whenever the tracking tags transmit. Thus, when there are multiple tracking tags, the data is effectively received as a plurality of separate data streams. A given payload (which may comprise one or more data packets) may include measurements taken at one or more time intervals, each of which may have a corresponding timestamp. In one scenario, the reader 106 may include a transceiver including both a receiver and a transmitter, which is configured to receive beacon signals from the tracking tags 102 and 104 and also to send and receive information with the server computing device 108.

The one or more server computing devices 108 may be configured to track characteristics of the tracking devices for one or more alerts based on a plurality of conditions. The plurality of conditions may include at least one condition for each characteristic, such as a minimum, a maximum, a threshold, a duration, or a geofence. The conditions may be predetermined or set based on user input. For example, a first alert may be set for when (1) a temperature is greater than, e.g., 0° C. to 10° C. for 30 minutes and (2) the tracking device is on a trip, which may indicate overheating of a cooled package or storage compartment. A second alert may be set for when (1) no motion is detected for 10 minutes, (2) 2 of 3 locations are in a geofence, and (3) the tracking device is on a trip, which may indicate that a package is out for delivery. A third alert may be set for when (1) a threshold amount of light is detected from inside a package and (2) the tracking device is on a trip, which may indicate unexpected opening of the package or tampering. A fourth alert may be set for when (1) a threshold amount of light is detected from inside a package and (2) 2 of 3 locations are in a destination geofence, which may indicate opening of the package after delivery or receipt. Many other alert conditions and tracking scenarios are possible, and the above examples are not intended to be limiting.

The tracking system 100 may optionally include an application that may be installed on one or more client computing devices. Using the application, the client computing devices may access the data from the reader 106 and/or the server computing device 108 through a network.

Figure 2:
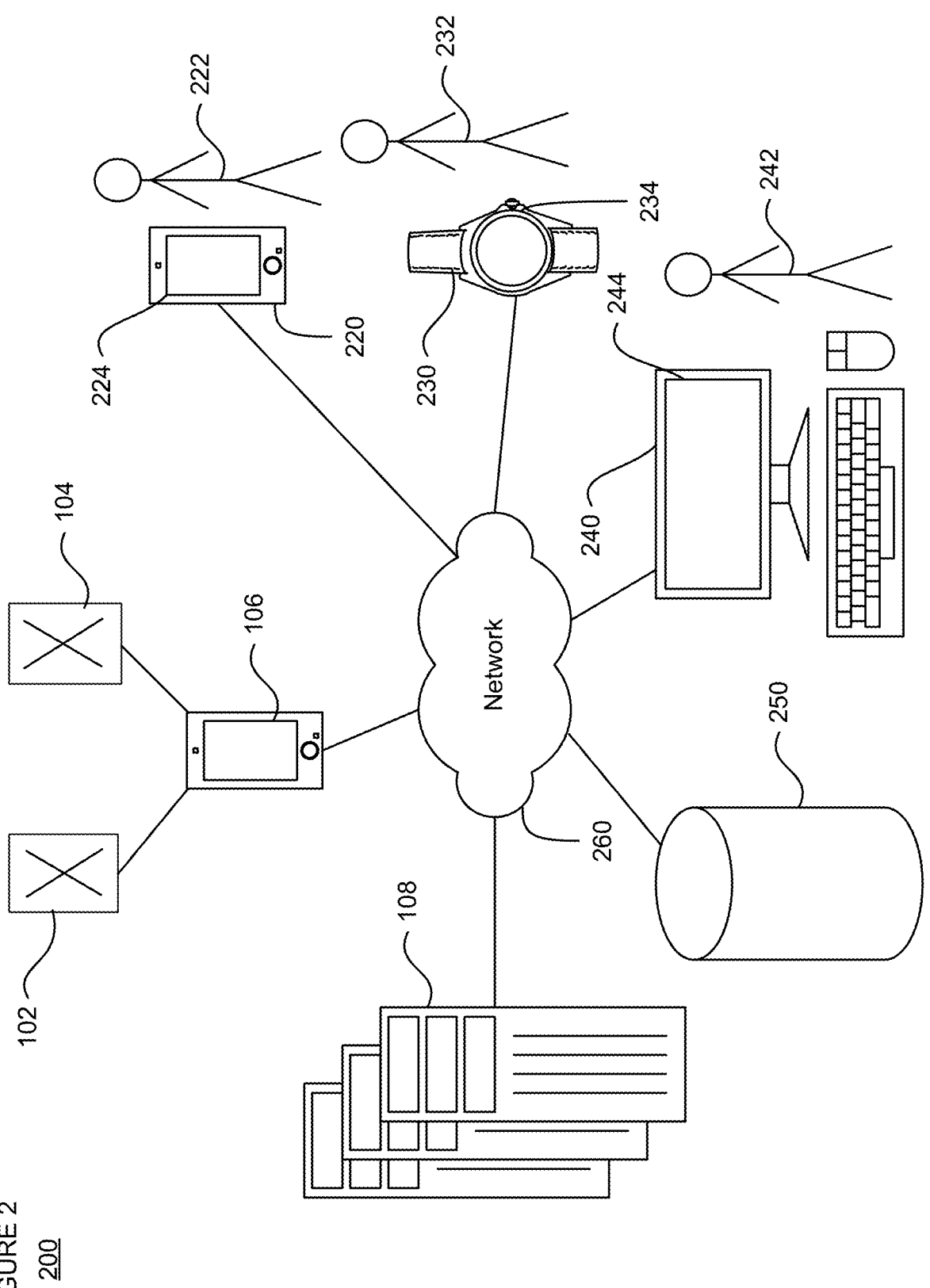
FIG. 2 is a pictorial diagram of an example network in accordance with aspects of the disclosure.
Figure 3:
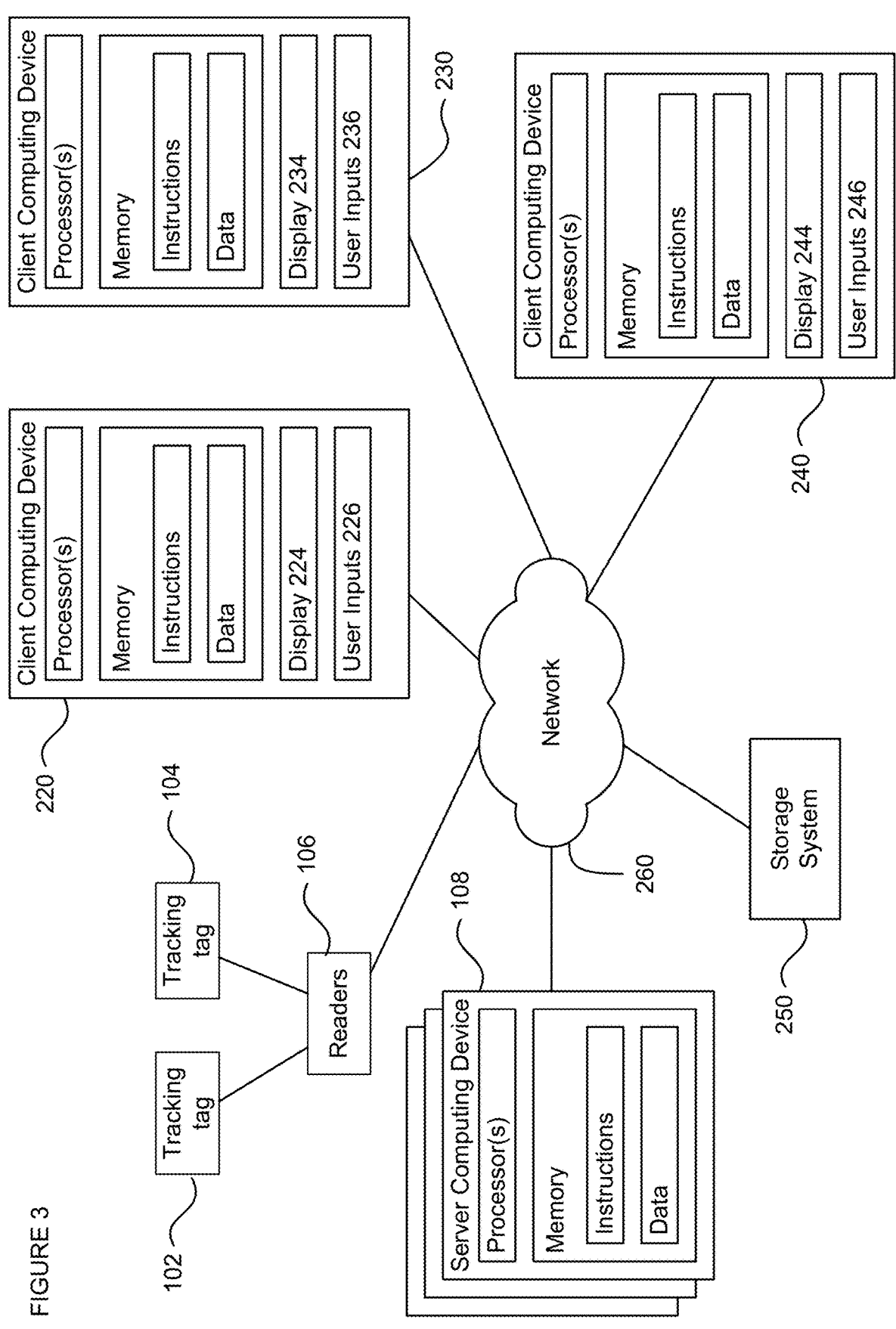
FIG. 3 is a functional diagram of the example network in FIG. 2 in accordance with aspects of the disclosure.

FIGS. 2 and 3 are pictorial and functional diagrams, respectively, of an example system 200 that includes a plurality of client computing devices 220, 230, 240 and a storage system 250 connected via a network 260. System 200 also includes tracking system 100, including tracking tags 102, 104, reader 106, and server computing device 108. Although only a few tags and computing devices are depicted for simplicity, a typical system may include significantly more.

Using the client computing devices, users, such as user 222, 232, 242, may view the location data on a display, such as displays 224, 234, 244 of respective client computing devices 220, 230, 240. As shown in FIG. 3, each client computing device 220, 230, 240 may be a personal computing device intended for use by a respective user and have all of the components normally used in connection with a personal computing device including a one or more processors (e.g., a central processing unit (CPU)), memory (e.g., RAM and internal hard drives) storing data and instructions, a display such as displays 224, 234, 244 (e.g., a monitor having a screen, a touch-screen, a head-mounted display, a smartwatch display, a projector, a television, or other device that is operable to display information), and user input devices 226, 236, 246 (e.g., one or more of a mouse, keyboard, touch screen and/or a microphone). The client computing devices may also include speakers, a network interface device, and all of the components used for connecting these elements to one another.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system (e.g., a smartwatch or head-mounted display, or a netbook that is capable of obtaining information via the Internet or other networks. As an example, the user may input information using a small keyboard, a keypad, microphone, using visual signals (gestures) with a camera or other sensor, or a touch screen.

As with memory 112, storage system 250 can be of any type of computerized storage capable of storing information accessible by the one or more server computing devices 108, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 250 may be connected to the computing devices via the network 260 as shown in FIG. 2, and/or may be directly connected to or incorporated into any of the client computing devices 220, 230, 240. The storage system 250 may store information about the tracking tags including, for example, location, status (e.g., activated and when), identifiers, last update, sensor data (e.g., temperature measurements), information about the object to which the tracking tag is attached (e.g., manufacturing data), and so on. In this regard, the information may be determined from received beacon signals provided to and updated at the storage system 250 by any of the one or more server computing devices 108 and/or client computing devices 220, 230, 240.

Figure 4A:
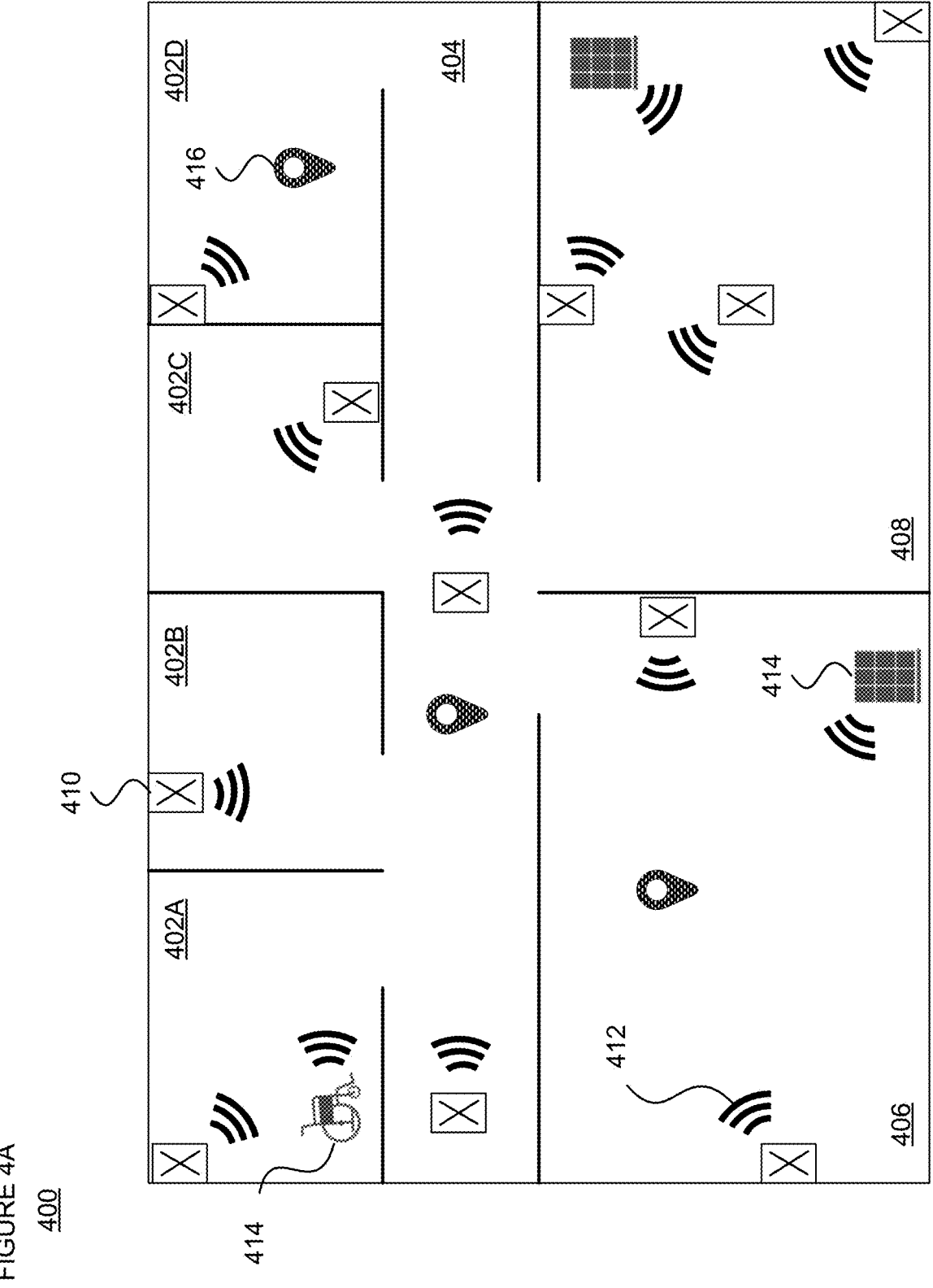
FIGS. 4A-B illustrate example scenarios in accordance with aspects of the disclosure.

FIG. 4A illustrates one example 400 of a system having a number of tracking tags arranged in various locations of a building (e.g., a hospital). In this example, there may be a number of rooms 402A-402D, such as patient rooms, along one side of a hallway 404. On the opposite side of the hallway 404 there is a storage room 406, such as to house equipment or supplies, as well as another room 408, which may be a meeting room, common area, rehab facility or the like. One or more fixed tracking tags 410 corresponding to the tracking tags 102 or 104 may be located in each room, including the hallway. Each fixed tracking tag 410 is configured to emit beacon signals 412 (e.g., RF signals in a selected frequency band according to a particular communication protocol). While the beacon signals 412 may appear directional, this need not be the case and the beacon signals may be transmitted omnidirectionally, for instance from a tracking tag 410 that is located on the ceiling, pillar or floor. In some implementations, the tracking tag 410 may be configured to emit beacon signals with information associated with its environment (e.g., temperature, humidity, etc.).

Tracking tags 414 may correspond to tracking tags 102 or 104 when placed on a variety of objects (e.g., a case of supplies as shown in storage room 406 or a wheelchair shown in room 402A). In some instances, the tracking tags may also be configured to emit beacon signals with information associated with the object on which the tracking tag is applied (e.g., temperature, motion information, object details, and/or other detectable characteristics of the tracking device or its environment). Readers 416 may be found at various locations in the building, such as in a patient room, the storage room, the hallway or other location. Note that even if transmitted omnidirectionally, the beacon signals from a given tracking tag may be attenuated in a non-uniform manner due to the presence of walls, furniture, floors/ceilings, equipment, etc.

Figure 4B:
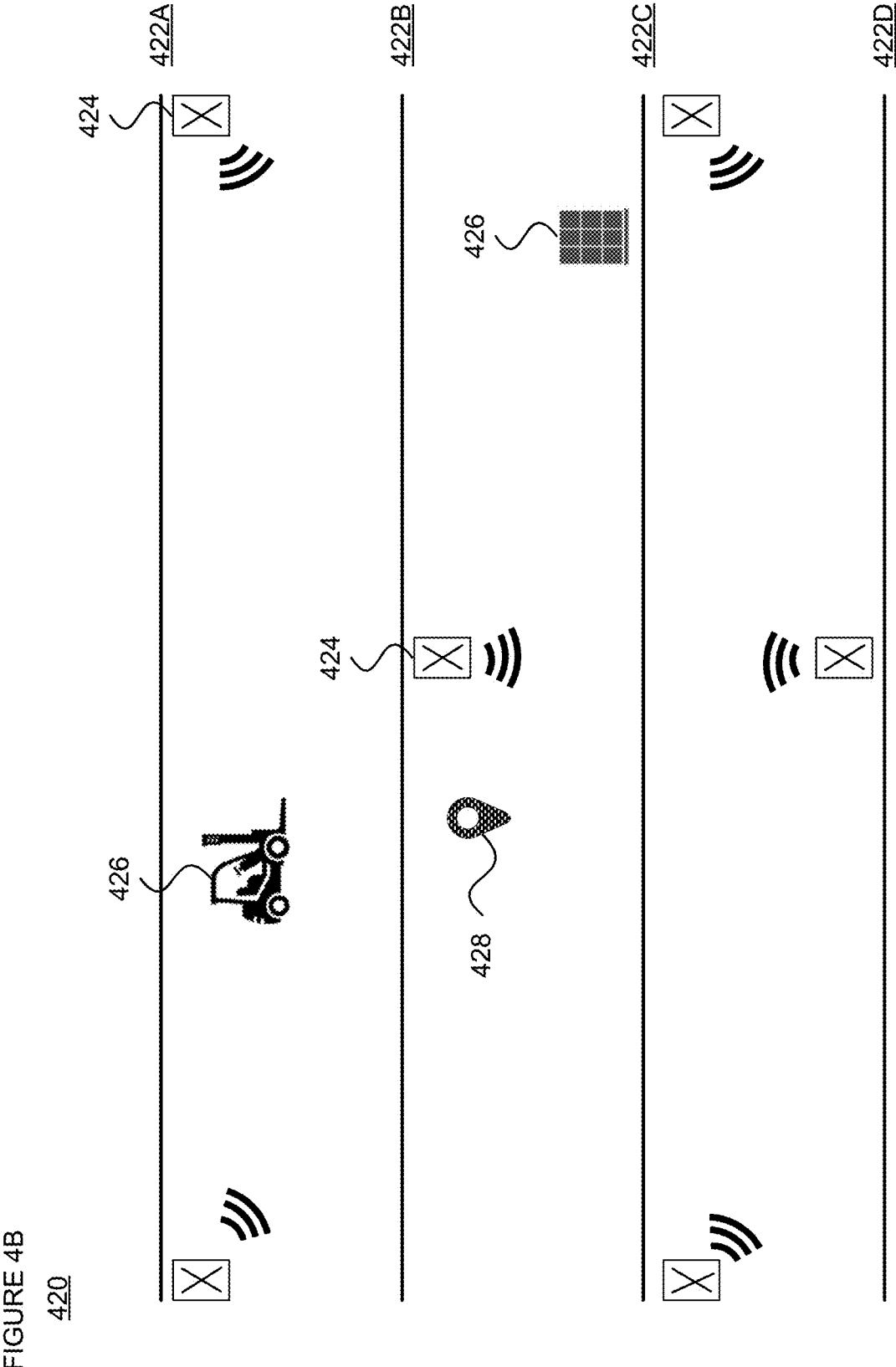

FIG. 4B illustrates another example 420 of a system having a number of fixed tracking tags positioned along different aisles in a warehouse setting. In this example, there are a number of aisles 422A-422D, although there may be more (or fewer) aisles, and the aisles may be arranged in other configurations than what is shown. Here, fixed tracking tags 424 are located at different places for the aisles, such as along aisle end caps, along the ceiling (or floor), on shelves, storage lockers, cabinets or other places along the aisle, etc. Similar to FIG. 4A, fixed tracking tags 426 are placed on or otherwise associated with different objects, such as a pallet of equipment or a forklift that retrieves items from their locations in the warehouse. As above, the fixed tracking tags are configured to transmit beacon signals that are detectable by one or more readers 428.

In order to determine the location of a given tracking tag, the system may use signal strength information obtained from the beacon signals of one or more tracking tags. A series of beacon signals may be ramped at different power levels (a ramped sequence). Evaluating the received beacon signals in view of their transmitted power can enable the system to determine which room or other location at which a given tracking tag is located. From that, the system is able to determine a location for a given tracking tag (and thus its corresponding object) with a suitable degree of certainty, such as by triangulating its position relative to the relevant tracking tags.

Figures 5A, 5B:
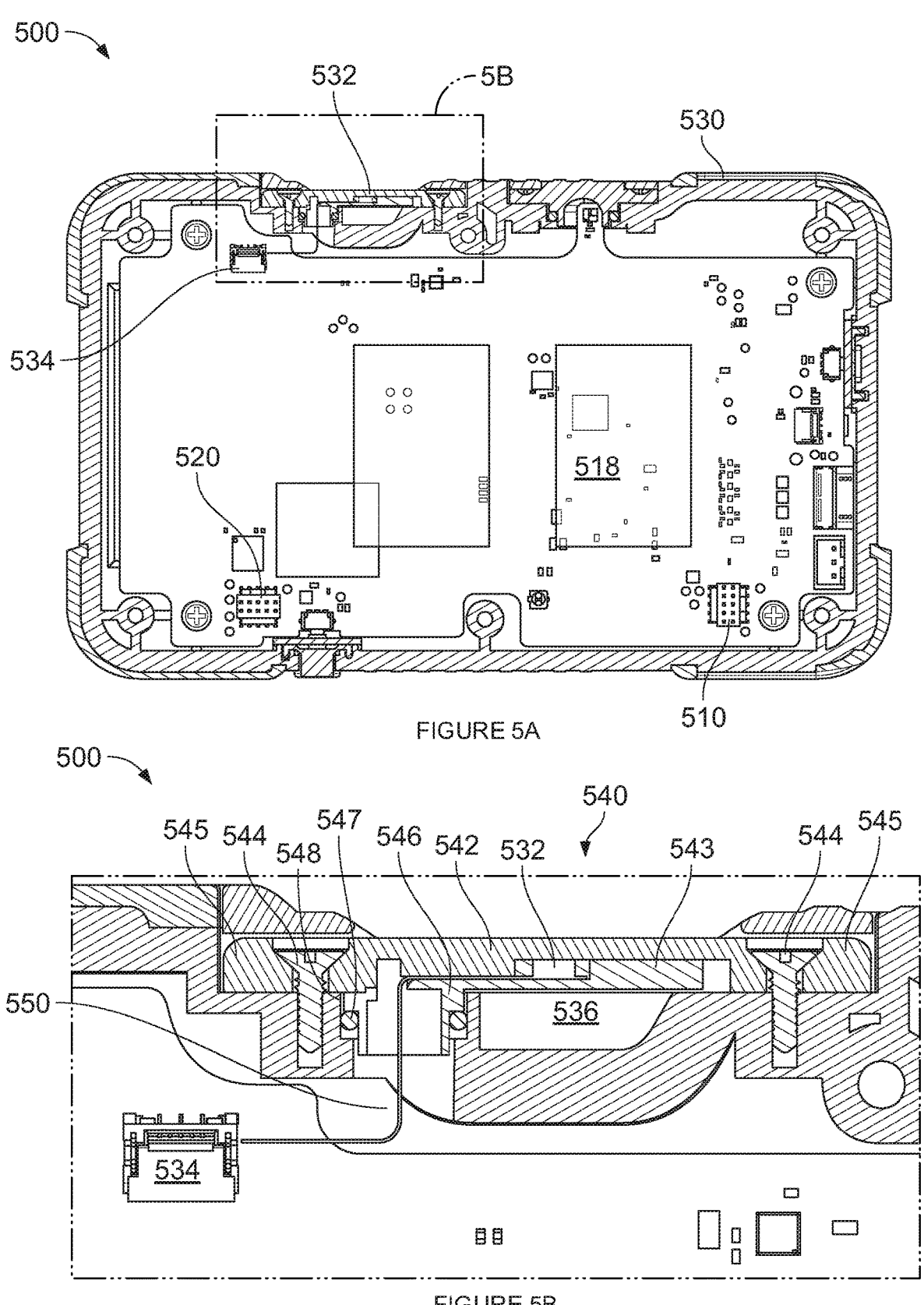
FIG. 5A depicts a schematic sectional view of a tracking tag reader in accordance with aspects of the disclosure.
FIG. 5B depicts a detail view from FIG. 5A.

FIG. 5A depicts a schematic sectional view of a tracking tag reader 500, which may integrate the functions of both the tags 102, 104 as well as reader 106. Similar to the reader 106, the tracking tag reader 500 may include one or more processors 510, memory 520 and other components typically present in general purpose computing devices. These may be configured similarly to processors 110 and memory 122 described above. In addition, the reader device may also include internal circuitry, such as a receive module 518. Like receive module 118, receive module 518 may have an antenna and a processing section (not shown), which may include a bandpass filter for the frequency band of interest, an analog to digital (A/D) converter, and a signal processing module to evaluate information in received beacon signals. The processing section may also convert the received beacon signal to a baseband signal, before or after A/D conversion. Generally, the internal circuitry of the tracking tag reader 500 may emit heat as the circuitry operates. The processors 510, memory 520, receive module 518, and other features of the tracking tag reader 500 may be housed within a casing 530.

Further, as mentioned above with reference to tracking characteristics of the tracking tags, the tracking tag reader 500 may be equipped with one or more sensors for detecting environmental conditions. For example, the tracking tag reader 500 may be equipped with a temperature sensor 532. Thus, the internal circuitry of the tracking tag reader 500 also may include a sensor reading module 534, which may for example measure voltage or current produced by the temperature sensor 532 or resistance of the temperature sensor 532.

The temperature sensor 532 may include, for example, a thermistor, RTD, thermocouple, or infrared photo-diode. Variants using a thermistor or RTD may sense temperature by supplying a voltage to the temperature sensor and measuring resistance. Variants using a thermocouple or photo-diode may sense temperature by monitoring a voltage or current that is produced by the temperature sensor. As such, thermocouple or photo-diode variants may have reduced power requirements as compared to other solutions.

The temperature sensor 532 may be external to the casing 530. For instance, the temperature sensor 532 may be separated from the casing 530 by an air gap 536 as depicted in FIG. 5B.

FIG. 5B depicts the temperature sensor 532 being attached to the tracking tag reader 500 in a sensor bridge assembly 540 so as to provide the air gap 536. In addition to the temperature sensor 532, the sensor bridge assembly 540 also includes a first backing 542 and a second backing 543. The first backing 542 and the second backing 543 may be formed from polycarbonate or other stiff plastic material, and may provide rigidity, toughness, and thermal conductivity to the sensor bridge assembly 540. Other suitable materials could include, e.g., copper, silver, gold, silicon carbide, stainless steel, or aluminum. Screws or other fasteners 544 may be used to attach ends 545 of the first backing 542 to the casing 530.

The second backing also includes a portion 546 (e.g., a grommet), which may be shaped as a funnel or other design. The shape and material of the portion 546 may allow the portion 546 to fit within a corresponding opening 548 in the casing 530. The portion 546 may be at one end of the second backing. A gasket 547 (e.g., an O-ring) may be placed onto the portion 546 to seal the opening 548. The gasket 547 may be formed of compliant material such as silicone or other materials suitable for providing a seal. A flex lead 550 may be placed through the portion 546 and the opening 548 in order to connect the temperature sensor 532 to the circuitry (e.g., the sensor reading module 534) inside the casing.

Figures 6A, 6B:
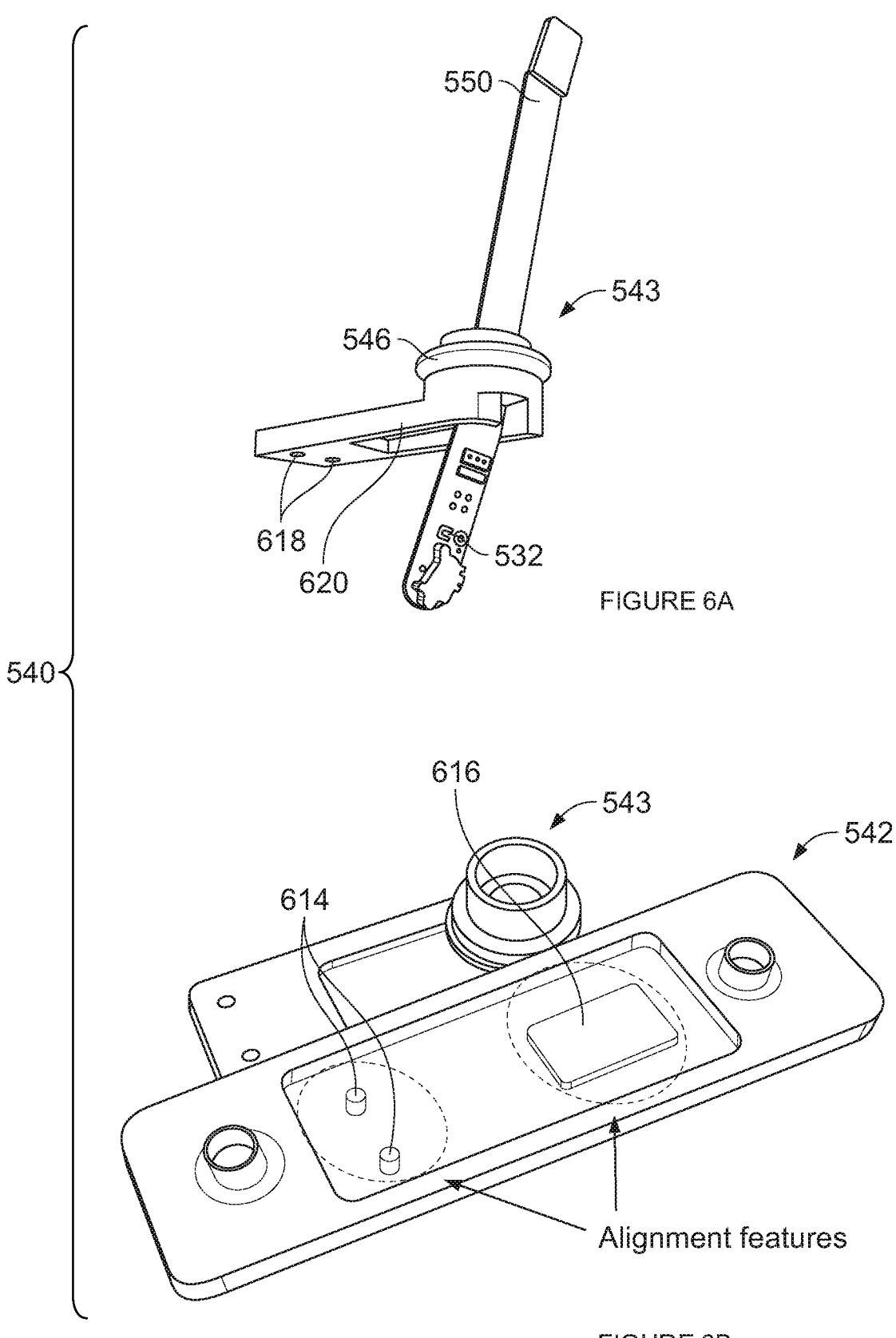
FIGS. 6A and 6B depict an example of a sensor bridge assembly in accordance with aspects of the disclosure.

FIGS. 6A and 6B show additional details of an example of a sensor bridge assembly 540. As shown in FIGS. 6A and 6B, the first backing 542 also may include protruding alignment features 614, 616 on a side that is intended to be oriented towards the temperature sensor 532. The second backing 543 also may include corresponding indented alignment features 618, 620 on a side of the second backing that is intended to be oriented towards the temperature sensor and the first backing. The protruding alignment features 614, 616 and indented alignment features 618, 620 may be complementary. For instance, protruding alignment features 614, 616 and indented alignment features 618, 620 may be sized and shaped to mate with one another in order to align and engage the first backing and the second backing as well as the temperature sensor in a desired orientation. For example, the alignment features 614, 618 may be generally circular whereas the alignment features 616, 620 (which may fit around the temperature sensor 532) may be generally rectangular.

Figure 7:
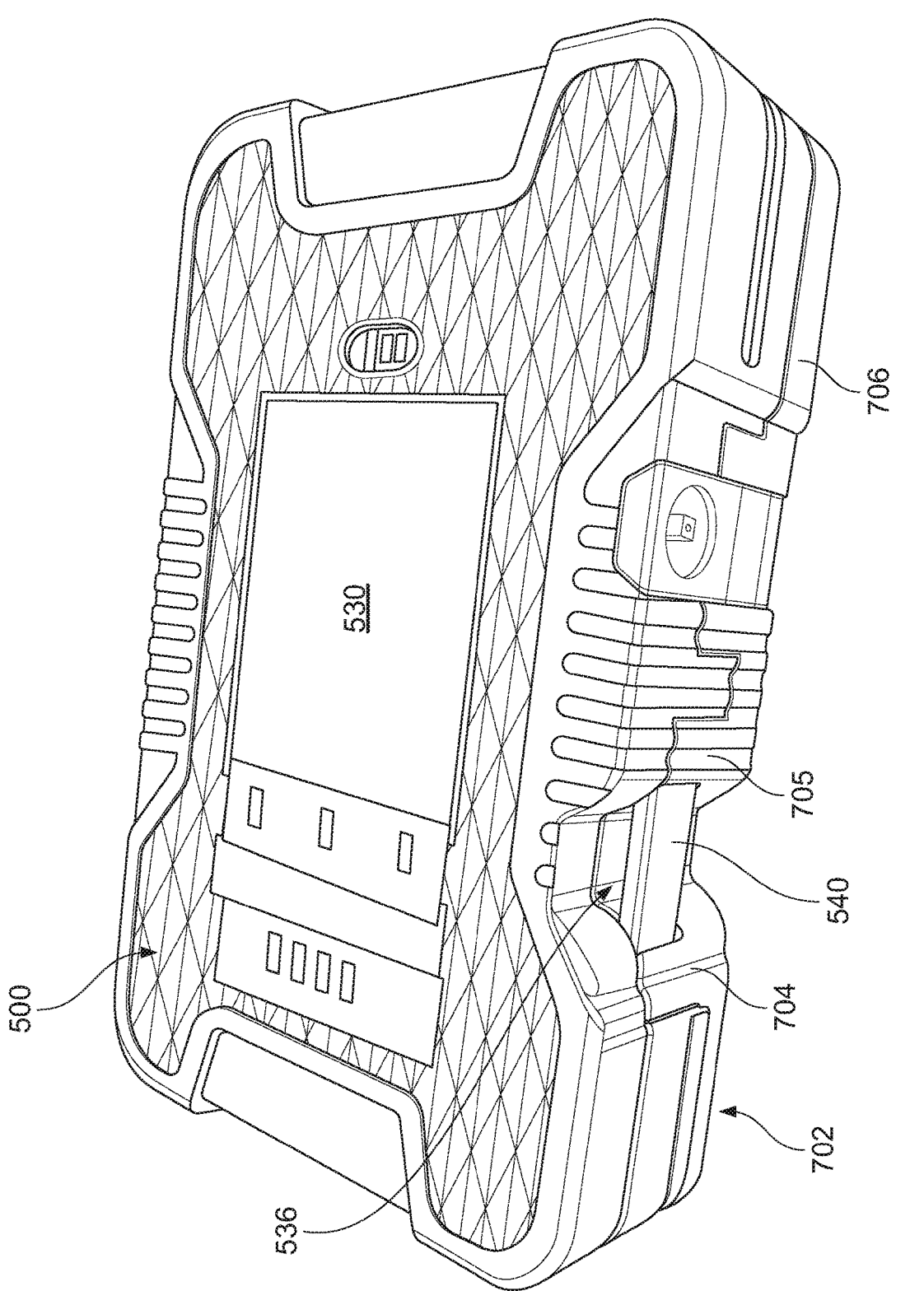
FIG. 7 depicts a tracking tag reader in accordance with aspects of the disclosure.

FIG. 7 depicts the sensor bridge assembly 540 assembled to the casing 530. As shown, the air gap 536 may be located between the casing 530 and the sensor bridge assembly 540. A side 702 of the casing 530 may include an indent which forms the air gap 536. The air gap 536 may function to isolate the temperature sensor 532 from the heat generated by circuitry within the tracking tag reader 500 and emanating from the casing 530. The air gap also may increase (e.g., double) the temperature sensor's exposure to ambient conditions, compared to a sensor mounted directly on the casing. Thus, exposing the temperature sensor 532 to ambient conditions at both sides of the sensor bridge assembly 540 may increase the temperature sensor's responsiveness to the environment.

The casing 530 may be formed of multiple parts that fit together to form the casing. Tabs 704, 705 may be formed on one part 706 of the casing and may cover ends of the sensor bridge assembly for additional stability and protection from detachment. In addition, the tabs may cover the heads of one or more fasteners (e.g., screws 544, as shown in FIG. 5B) to prevent the fasteners from first backing out of the sensor bridge assembly.

Example Methods

FIG. 8 depicts a flowchart of a method 800 for making a tracking tag reader 500 that can sense ambient conditions, e.g., temperature. The tracking tag reader 500 may generate heat while in operation, so that the accuracy of an ambient temperature sensor 532 may be improved by somehow isolating the temperature sensor from the heat produced by the device. This can be done, for example, by positioning the temperature sensor 532 in a bridge 540 that is attached to the casing 530.

At block 802, a bridge is formed by positioning the temperature sensor between a portion of a first backing and a portion of a second backing, with a flex lead of the temperature sensor positioned through a grommet of the second backing. For instance, the bridge 540 may be formed by positioning the temperature sensor 532 between a portion of a first backing 542 and a portion of a second backing 543. The flex lead 550 of the temperature sensor 532 may be positioned through a grommet 546 of the second backing 543.

The temperature sensor may be one of a thermistor, a resistance temperature detector, a thermocouple, or an infrared photo-diode. The first backing may comprise polycarbonate. The second backing may comprise silicone. The temperature sensor may be sandwiched between the first backing and the second backing, to maintain contact with the first backing for thermal coupling. Thermal grease (not shown) may be used around the temperature sensor to increase thermal coupling with the first backing.

At block 806, the sensor bridge assembly may be attached to the casing of the device such that an air gap separates the temperature sensor from the casing, and so that the temperature sensor is connected in communication with a sensor reading module within the casing. For instance, the sensor bridge assembly 540 is attached to the casing 530 of the tracking tag reader 500 such that an air gap 536 separates the temperature sensor 532 from the casing. The sensor bridge assembly 540 can be attached with screws or other fasteners. The flex lead 550 is connected through the opening 548 in the casing 530 to circuitry (e.g., the sensor reading module 534) inside the casing. By sealing the opening 548, this may prevent moisture or debris from entering the device. For example, the gasket 547 seals the opening 548 in the casing 530. Thus, the temperature sensor 532 may be attached to the casing 530 and to the sensor reading module 534 in such a way that heating of the temperature sensor from the casing is reduced while the temperature sensor's ability to sense ambient temperature is enhanced.

The features and methodology described herein may provide a device that senses ambient conditions such as temperature. A bridge structure may provide an air gap between a temperature sensor and a casing of the device. The air gap may increase surface area for sensing while also reducing the effects of heat generated by the device. Moreover, the design of the bridge may provide a compact form factor for the overall device. Thus, the device with the sensor bridge assembly may be more durable and portable compared to alternative solutions for reducing the effects of heat generated by the device on temperature sensors. In some instances, the temperature sensor may include a thermocouple, or an infrared photo-diode, which may have reduced power requirements as compared to other solutions.

The invention claimed is:

1. A device comprising:
   a casing having an external surface with an indented portion;
   circuitry within the casing; and
   a temperature sensor;
   connected to the circuitry and arranged within a bridge assembly attached to the casing such that the indented portion forms an air gap that separates the bridge assembly and temperature sensor from the external surface of the casing.

2. The device of claim 1, wherein the bridge assembly, which comprises:
   a first backing; and
   a second backing, which includes a grommet, wherein the temperature sensor is positioned between a portion of the first backing and a portion of the second backing, and wherein the temperature sensor includes a flex lead that is electrically connected through the grommet of the second backing to the circuitry within the casing.

3. The device of claim 2, wherein the first backing comprises polycarbonate.

4. The device of claim 2, wherein the second backing comprises silicone.

5. The device of claim 2, wherein the first backing is further from the casing and is more rigid than the second backing.

6. The device of claim 2, further comprising a gasket that seals an opening in the casing.

7. The device of claim 1, wherein the temperature sensor is one of a thermistor or a resistance temperature detector.

8. The device of claim 1, wherein the temperature sensor is one of a thermocouple or an infrared photo-diode.

9. A sensor bridge assembly comprising:
   a first backing having a first plurality of alignment features;
   a second backing having a second plurality of alignment features;
   a temperature sensor that is positioned between a portion of the first backing and a portion of the second backing, such that the first plurality of alignment features and the second plurality of alignment features are oriented towards the temperature sensor; and
   a flex lead that is electrically connected to the temperature sensor and extends through a grommet of the second backing.

10. The sensor bridge assembly of claim 9, wherein the first backing comprises polycarbonate.

11. The sensor bridge assembly of claim 9, wherein the second backing comprises silicone.

12. The sensor bridge assembly of claim 9, wherein the temperature sensor is one of a thermistor or a resistance temperature detector.

13. The sensor bridge assembly of claim 9, wherein the temperature sensor is one of a thermocouple or an infrared photo-diode.

14. A method for manufacturing a device for sensing ambient temperature, the method comprising:
   forming a sensor bridge assembly by positioning a temperature sensor configured to sense the ambient temperature between a portion of a first backing and a portion of a second backing, wherein the second backing has a grommet at one end thereof and a flex lead of the temperature sensor protrudes through the grommet of the second backing; and
   attaching the sensor bridge assembly to a casing of the device such that an air gap separates the sensor bridge assembly and the temperature sensor from an external surface of the casing and such that the flex lead connects through an opening in the casing to circuitry inside the casing.

15. The method of claim 14, wherein the first backing comprises polycarbonate.

16. The method of claim 14, wherein the second backing comprises silicone.

17. The method of claim 14, wherein the temperature sensor is one of a thermistor or a resistance temperature detector.

18. The method of claim 14, wherein the temperature sensor is one of a thermocouple or an infrared photo-diode.

19. The method of claim 14, further comprising placing a gasket onto the grommet to seal the opening in the casing of the device.

20. The method of claim 14, wherein the first backing has a first plurality of alignment features and the second backing has a second plurality of alignment features, and wherein forming the sensor bridge assembly includes orienting the first plurality of alignment features and the second plurality of alignment features towards the temperature sensor.

* * * * *